(12) United States Patent
Wu

(10) Patent No.: US 12,138,645 B2
(45) Date of Patent: Nov. 12, 2024

(54) LIQUID PUMP

(71) Applicant: HCP PACKAGING CO., LTD., Jiangsu (CN)

(72) Inventor: Ming Kei Wu, Jiangsu (CN)

(73) Assignee: HCP PACKAGING CO., LTD., Jiangsu (CN)

( * ) Notice: Subject to any disclaimer, the term of this patent is extended or adjusted under 35 U.S.C. 154(b) by 181 days.

(21) Appl. No.: 17/790,356

(22) PCT Filed: Feb. 5, 2021

(86) PCT No.: PCT/CN2021/075514
§ 371 (c)(1),
(2) Date: Jun. 30, 2022

(87) PCT Pub. No.: WO2022/156007
PCT Pub. Date: Jul. 28, 2022

(65) Prior Publication Data
US 2023/0241633 A1    Aug. 3, 2023

(30) Foreign Application Priority Data
Jan. 22, 2021 (CN) .......................... 202110088197.9

(51) Int. Cl.
*B05B 11/10* (2023.01)
*B05B 11/00* (2023.01)

(52) U.S. Cl.
CPC ...... *B05B 11/1069* (2023.01); *B05B 11/1074* (2023.01); *B05B 11/0044* (2018.08)

(58) Field of Classification Search
CPC ............. B05B 11/1069; B05B 11/1074; B05B 11/0044; B05B 11/1023; B05B 11/1047; B05B 11/1042; B05B 11/1001; A45D 34/00; A45D 2200/056; Y02W 30/80
See application file for complete search history.

(56) References Cited

U.S. PATENT DOCUMENTS

| 2021/0178414 A1* | 6/2021 | Lee ..................... B05B 11/0064 |
| 2023/0173518 A1* | 6/2023 | Lee ..................... B05B 11/1047 222/336 |

FOREIGN PATENT DOCUMENTS

| CN | 201880641 U | 6/2011 |
| CN | 202897106 U | 4/2013 |
| CN | 204896183 U | 12/2015 |
| CN | 111924316 A | 11/2020 |
| CN | 112793913 A | 5/2021 |
| CN | 214268736 U | 9/2021 |

(Continued)

*Primary Examiner* — Donnell A Long
(74) *Attorney, Agent, or Firm* — Schmeiser, Olsen & Watts LLP

(57) ABSTRACT

A liquid pump is provided, including a pump body and a valve seat, the pump body is an integral part integrally formed by the same material, the pump body includes a shell with a hollow pump cavity and an elastic valve plate disposed at a bottom end portion of the shell, and the elastic valve plate is provided with a valve passage, the valve seat is disposed below the elastic valve plate in a fitted manner, the valve seat includes a valve body with a liquid flow passage, and the top of the valve body is provided with a seal structure that can be fitted with the elastic valve plate in a sealed manner. The product assembly is more convenient, product durability is high, and all components can be fully recycled.

14 Claims, 13 Drawing Sheets

(56) References Cited

FOREIGN PATENT DOCUMENTS

| EP | 0498275 | A1 | | 8/1992 | | |
|---|---|---|---|---|---|---|
| EP | 1052025 | A2 | | 11/2000 | | |
| GB | 389282 | A | * | 3/1933 | ......... | B05B 11/1052 |

* cited by examiner

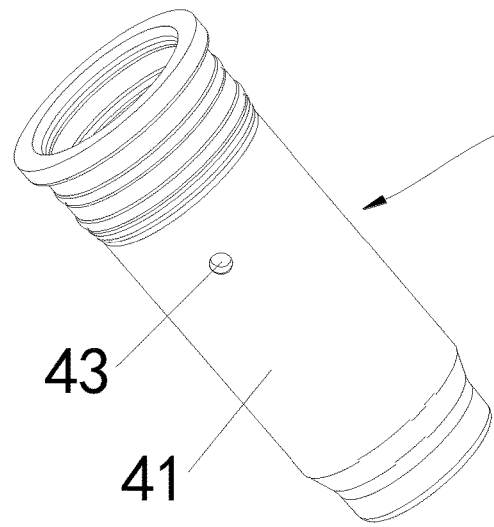 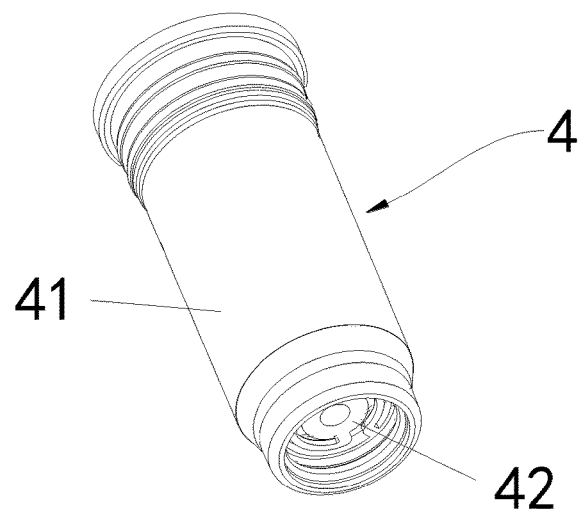
Fig. 11　　　　　Fig. 12
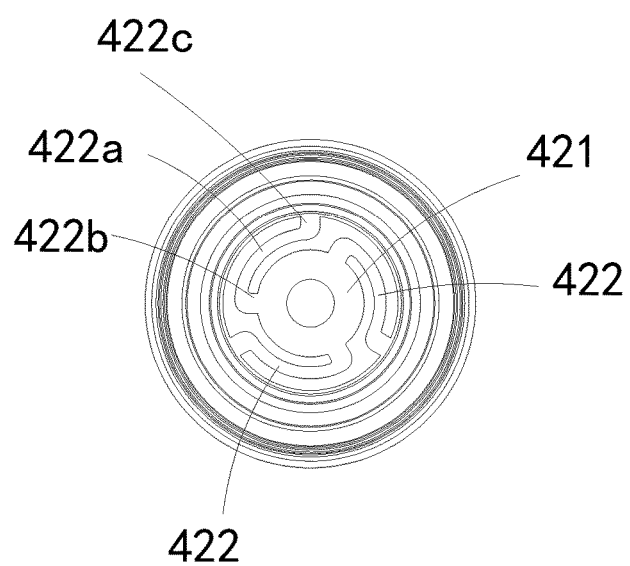
Fig. 13

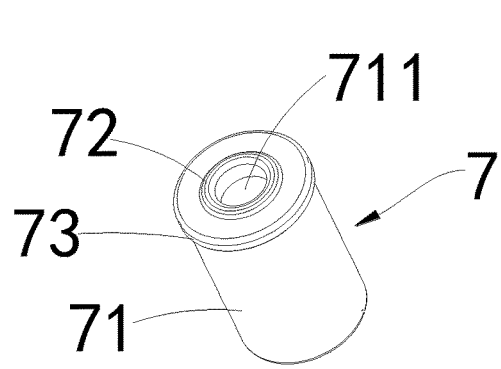
Fig. 18
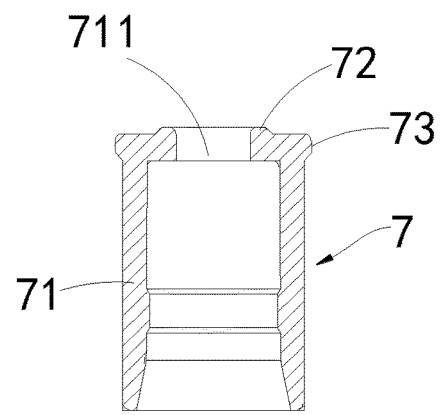
Fig. 19
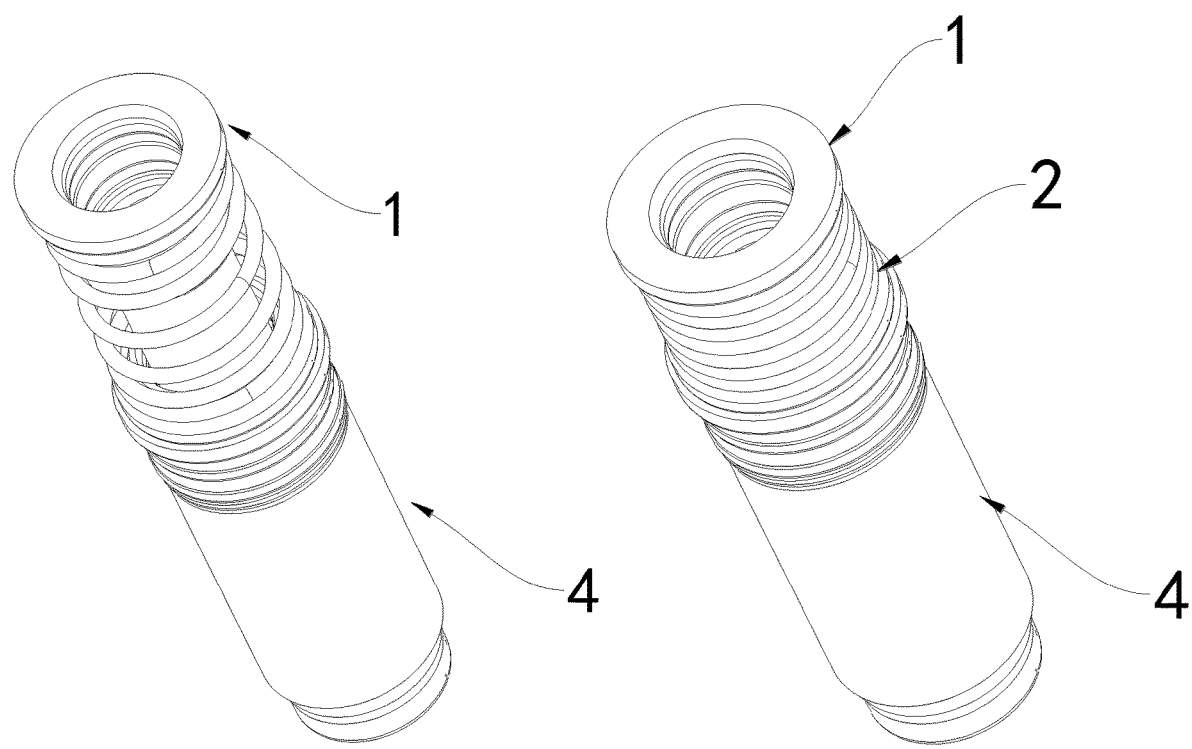
Fig. 20
Fig. 21

LIQUID PUMP

CROSS-REFERENCE TO RELATED APPLICATIONS

This application claims priority to PCT Application No. PCT/CN2021/075514, having a filing date of Feb. 5, 2021, which claims priority to CN Application No. 2021100881979, having a filing date of Jan. 22, 2021, the entire contents both of which are hereby incorporated by reference.

FIELD OF TECHNOLOGY

The following relates to a field of cosmetics packaging containers, in particular to a liquid pump.

BACKGROUND

Liquid pumps are widely used in the field of cosmetics to facilitate people's daily life. They are mainly used to pump liquids in daily cleaning and skin care products such as hand sanitizer, shower gel, shampoo, facial cleanser, and moisturizer. Existing liquid pumps have various structural forms, and usually have components such as a pump body, a piston rod, a piston, a head cap connecting rod, and a spring. When the liquid needs to be pumped out, press the head cap connecting rod down to drive the piston rod to move downward to pump out the liquid previously stored in the pump body. After the liquid is pumped out, release the hand, the piston rod moves upward under the elastic force of the spring, so that the liquid is sealed inside the pump body again, which is very convenient to use.

The liquid pump in the conventional art still has the following problems:
1. In the current pump core, glass balls and steel balls are mostly used at the lower valve. The lower valve and the pump casing need to be separately injection-molded and then assembled, which is not only complicated in structure and low in assembly efficiency, but also requires a variety of production materials, resulting in high production costs. It also causes a problem that the pump core products cannot be recycled as a whole;
2. The lower portion of the piston is easy to crack after long-term service;
3. The head cap connecting rod is made of PP (polypropylene) material, and the piston head is made of POM (polyoxymethylene resin) material, so as to achieve the effect of preventing loosening in the cooperation between the head cap connecting rod and the piston head. However, POM material is not conducive to environmentally friendly recycling.

SUMMARY

An aspect relates to a liquid pump with a novel structure to solve one or more problems of the conventional art.

To achieve the above purpose, a technical solution adopted by the present disclosure is: A liquid pump, comprises at least a pump body and a valve seat, the valve seat is mounted at a lower end portion of the pump body, the pump body is an integral part integrally formed by a same material, the pump body comprises a shell with a hollow pump cavity and an elastic valve plate disposed at a bottom end portion of the shell, and the elastic valve plate is provided with a valve passage, the valve seat is cooperatively disposed below the elastic valve plate, the valve seat comprises a valve body with a liquid flow passage, and a top of the valve body is provided with a seal structure that can be fitted with the elastic valve plate in a sealed manner.

In an embodiment, the elastic valve plate comprises a valve plate and an elastic strip connected between the valve plate and an inner peripheral wall of the shell, there are gaps between the elastic strip and the valve plate and between the elastic strip and the inner peripheral wall of the shell, and all the gaps together form the valve passage.

In an embodiment, the valve plate is in a shape of a disc, the elastic strip comprises an arc-shaped extension section, and a first connecting section and a second connecting section respectively disposed at two ends of the arc-shaped extension section, an extension trajectory of the arc-shaped extension section is a circular arc with a center of the valve plate as a center of rotation, the first connecting section extends inward along a radial direction of the arc-shaped extension section and is connected to the valve plate, and the second connecting section extends outward along the radial direction of the arc-shaped extension section and is connected to the shell.

In an embodiment, a plurality of elastic strips is provided, and all the elastic strips are distributed on an outer side of the valve plate at intervals along a circumferential direction.

In an embodiment, the seal structure is an annular protruding platform or a flat surface disposed on the top of the valve body, and a top surface of the annular protruding platform or the flat surface is mating contact with a bottom surface of the valve plate.

In an embodiment, the elastic valve plate has an open state and a closed state, when the elastic valve plate is in the open state, the valve plate elastically moves upward, the valve plate is disengaged from the seal structure, and the valve passage and the liquid flow passage communicate with each other; when the elastic valve plate is in the closed state, the valve plate resets, the valve plate and the seal structure are in a sealing fit, and the valve passage and the liquid flow passage are not communicated with each other.

In an embodiment, the valve seat is detachably clamped and fixed on a lower portion of the shell and is located below the elastic valve plate.

In an embodiment, both the valve seat and the pump body are obtained by molding from recyclable plastics.

In an embodiment, the liquid pump further comprises a piston rod, a piston, a connecting rod and a lock cover, wherein the lock cover is fixed on an upper end portion of the pump body, the connecting rod and the lock cover are in a sliding fit, the piston rod is fixedly connected with the connecting rod, the piston is sleeved on the piston rod in a sliding fit, and the piston is slidably disposed in the pump body and is in a sealed connection with the pump body.

Further, the connecting rod has a mounting hole extending in the axial direction, the piston rod passes through the mounting hole in a fitted manner in the axial direction, and clamping structures fitted with each other are provided between an outer peripheral portion of the piston rod and an inner peripheral wall of the mounting hole.

In an embodiment, the clamping structures comprises an annular positioning protrusion disposed on the inner peripheral wall of the mounting hole, and a positioning groove disposed on the outer peripheral portion of the piston rod, and the annular positioning protrusion is fitted with and clamped in the positioning groove; the clamping structure further comprises a plurality of annular clamping grooves disposed on the inner peripheral wall of the mounting hole at intervals along the axial direction, and a plurality of annular clamping protruding platforms disposed on the outer peripheral portion of the piston rod at intervals along the axial direction, the annular positioning protrusion is located above all the annular clamping grooves, the positioning groove is located above all the annular clamping protruding platforms, and all the annular clamping protruding platforms are fitted and clamped with all the annular clamping grooves in a one-to-one correspondence.

In an embodiment, the connecting rod and the piston rod are both made of PP material or PE material.

Further, the piston rod comprises a rod body fitted and connected with the connecting rod, and a piston head fixedly disposed on a lower end of the rod body, the piston has an inner piston body in sliding fit with the rod body, and an outer piston body in sliding fit with the pump body, and an annular groove is formed between the piston head and the rod body, into which a lower end portion of the inner piston body can be inserted in a fitted manner.

Further, the lock cover is provided with a through hole penetrating in the axial direction, the connecting rod passes through the through hole in a sliding fit in the axial direction, and the liquid pump further comprises an elastic member disposed between an upper end portion of the lock cover and an upper end portion of the connecting rod and providing the force required for the connecting rod to move upward, a lower end portion of the connecting rod has a limit protruding platform protruding outward along an outer peripheral wall of the connecting rod, an outer diameter of the limit protruding platform is larger than an aperture of the through hole, and the limit protruding platform is located below the lock cover.

Further, an inner peripheral portion of the lock cover has a plurality of ribs extending in an up-down direction, all the ribs are distributed at intervals along the circumferential direction, and an air passage is formed between two adjacent ribs.

Further, an outer peripheral portion of the lock cover and an upper portion of the pump body are clamped and fixed with each other in a fitted manner through a plurality of pairs of clamping grooves and protrusions.

Due to the application of the above technical solutions, the present disclosure has the following advantages over the conventional art:

1. The elastic valve plate is integrated at the bottom of the pump body, the opening and closing of the valve seat is realized by the cooperation of the elastic valve plate and the valve seat, and there is no need to provide glass balls or steel balls and other components. The structure is simpler and the installation is more convenient, at the same time, the pump body and the valve seat can be integrally formed with environmentally friendly materials, which is convenient for recycling;
2. The connection between the connecting rod and the piston rod is more stable, and the anti-loosening effect is good;
3. When the piston rod is fitted with the piston, it will not cause the piston to crack, and the durability of the piston is better;
4. The flanges of the pump body and the lock cover are small, so there is no need to leave a flange with larger size on the pump cover for fitting.

BRIEF DESCRIPTION

Some of the embodiments will be described in detail, with references to the following Figures, wherein like designations denote like members, wherein:

FIG. 11 is a schematic three-dimensional diagrams of a pump body in the liquid pump of Embodiment 1;

FIG. 12 is a schematic three-dimensional diagrams of a pump body in the liquid pump of Embodiment 1;

FIG. 13 is a schematic bottom view of the pump body in the liquid pump of Embodiment 1;

FIG. 18 is a schematic three-dimensional diagram of a valve seat in the liquid pump of Embodiment 1;

FIG. 19 is a schematic longitudinal cutaway view of the valve seat in the liquid pump of Embodiment 1;

FIG. 20 is a schematic diagram of the overall structure of the liquid pump of Embodiment 2, wherein the liquid pump is in an unpressed state;

FIG. 21 is a schematic diagram of the overall structure of the liquid pump of Embodiment 2, wherein the liquid pump is in a pressed state;

DETAILED DESCRIPTION

In the following, the technical solution of the present disclosure is further described combining with the accompanying drawings and specific embodiments.

Embodiment 1

Figure 5:
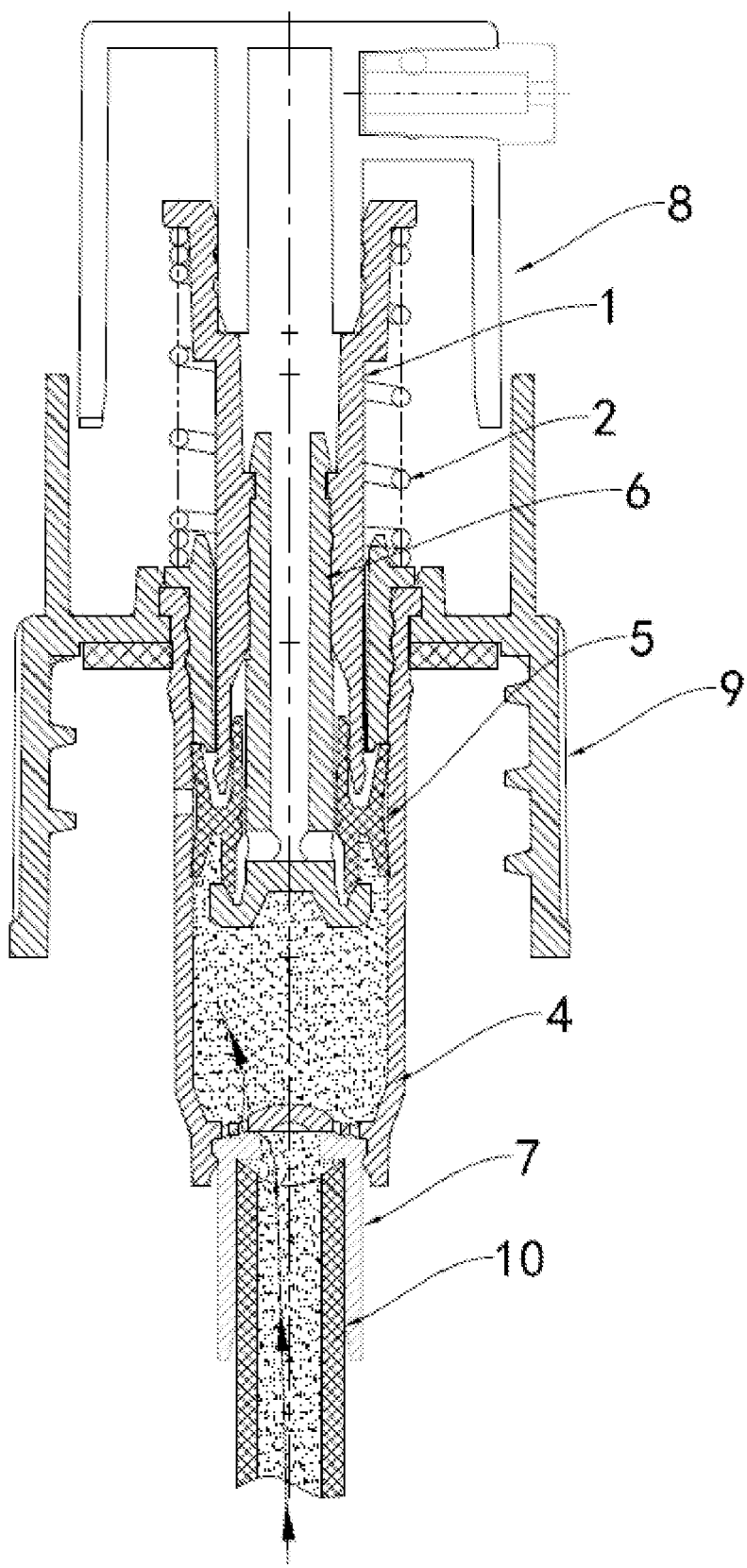
FIG. 5 is a schematic diagram of the mounting and connection between the liquid pump and a container lid of Embodiment 1, wherein the liquid pump sucks liquid from a bottle body.
Figure 6:
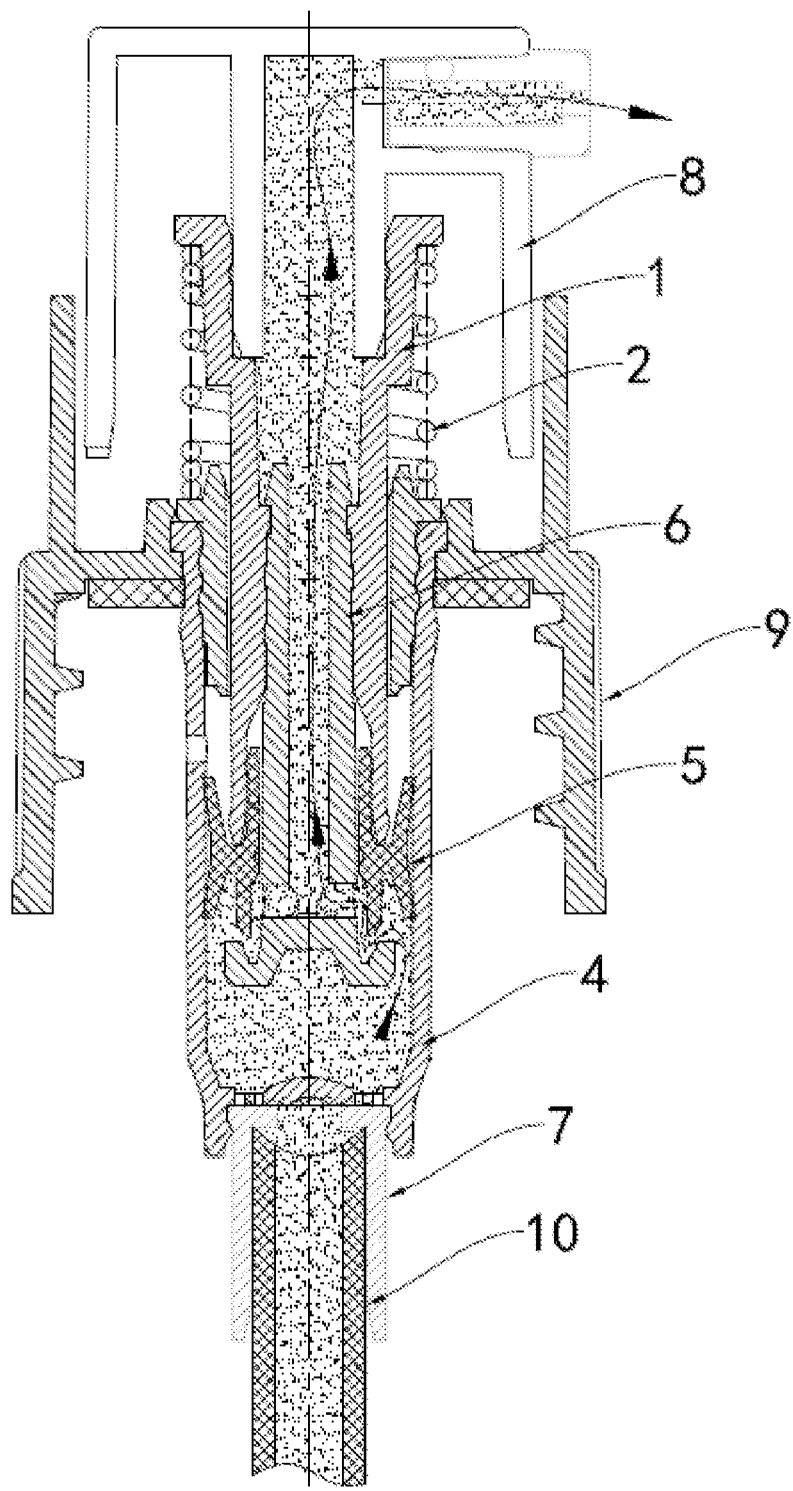
FIG. 6 is a schematic diagram of the mounting and connection between the liquid pump and the container lid of Embodiment 1, wherein the liquid pump pumps liquid out.
Figure 7:
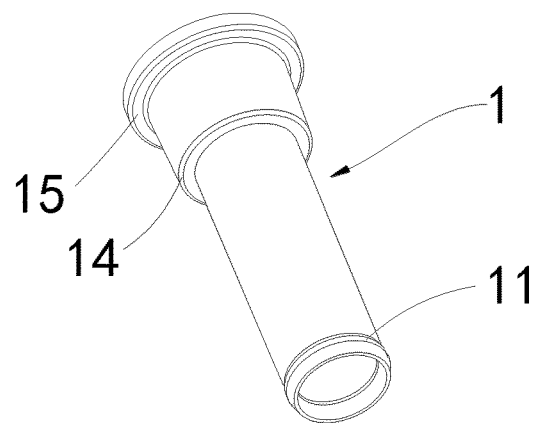
FIG. 7 is a schematic three-dimensional diagram of a connecting rod in the liquid pump of Embodiment 1.
Figure 8:
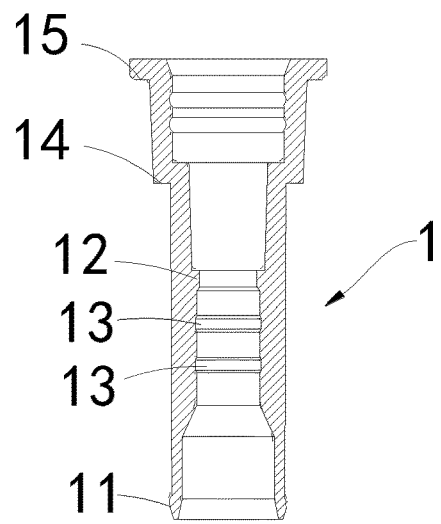
FIG. 8 is a schematic longitudinal cutaway view of the connecting rod in the liquid pump of Embodiment 1.
Figure 9:
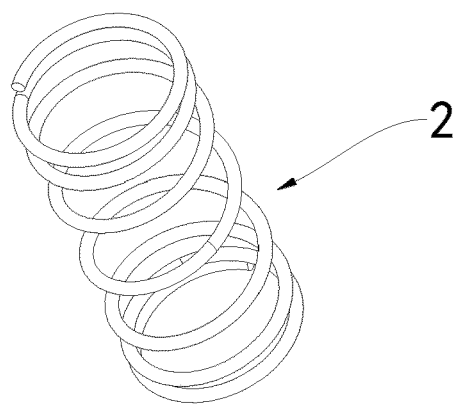
FIG. 9 is a schematic three-dimensional diagram of a spring in the liquid pump of Embodiment 1.
Figure 10:
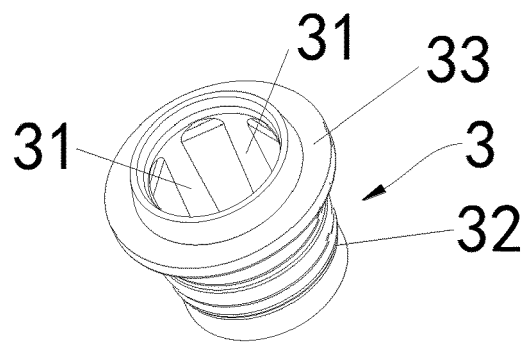
FIG. 10 is a schematic three-dimensional diagram of a lock cover in the liquid pump of Embodiment 1.
Figure 14:
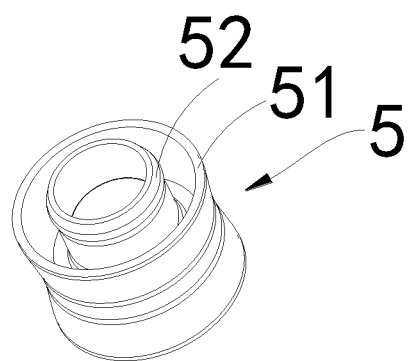
FIG. 14 is a schematic three-dimensional diagram of a piston in the liquid pump of Embodiment 1.
Figure 15:
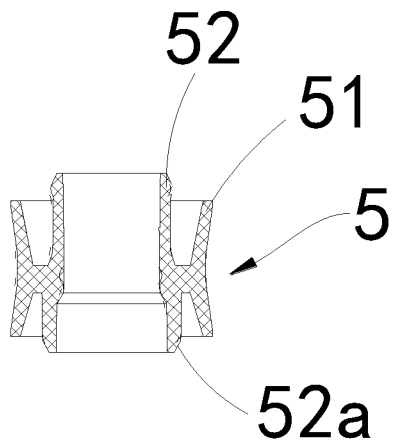
FIG. 15 is a schematic longitudinal cutaway view of the piston in the liquid pump of Embodiment 1.
Figure 16:
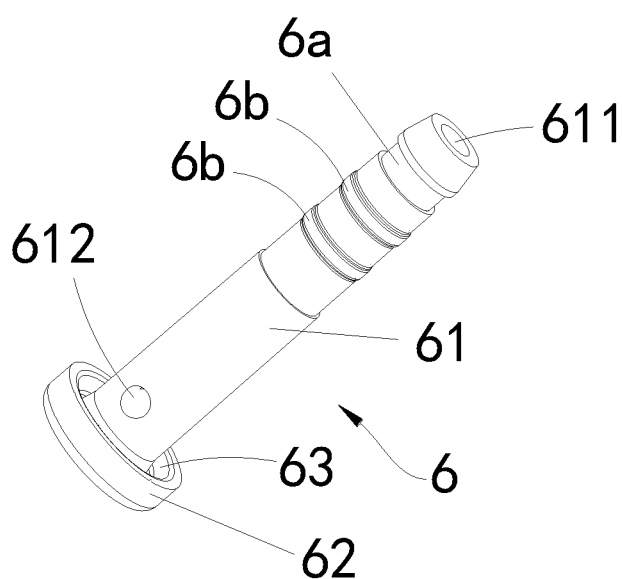
FIG. 16 is a schematic three-dimensional diagram of a piston rod in the liquid pump of Embodiment 1.
Figure 17:
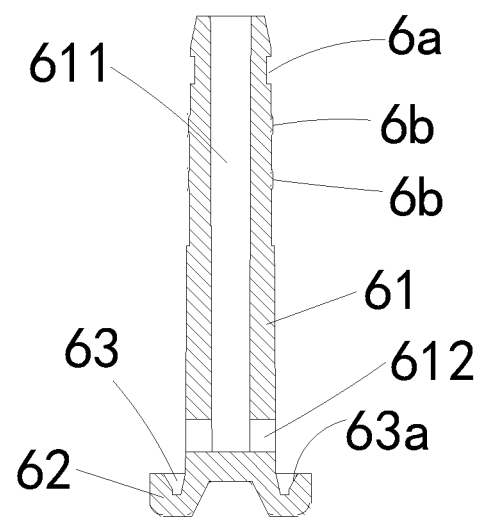
FIG. 17 is a schematic longitudinal cutaway view of the piston rod in the liquid pump of Embodiment 1.
Figure 22:
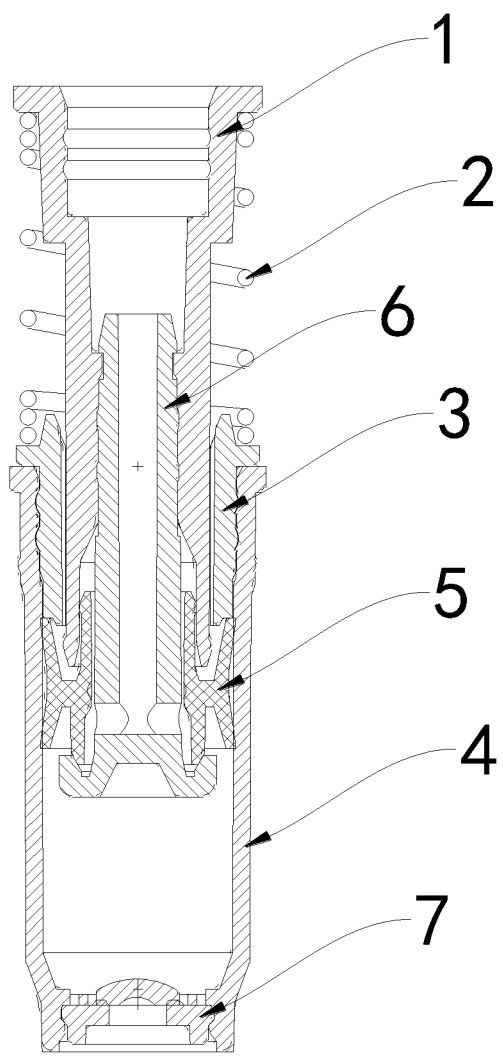
FIG. 22 is a schematic longitudinal cutaway view of the liquid pump of Embodiment 2, wherein the liquid pump is in the unpressed state.
Figure 23:
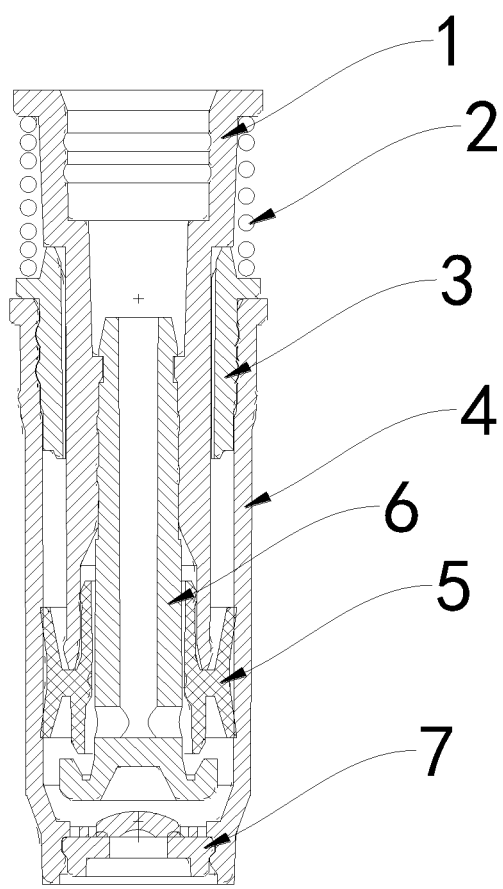
FIG. 23 is a schematic longitudinal cutaway view of the liquid pump of Embodiment 2, wherein the liquid pump is in the pressed state.
Figure 24:
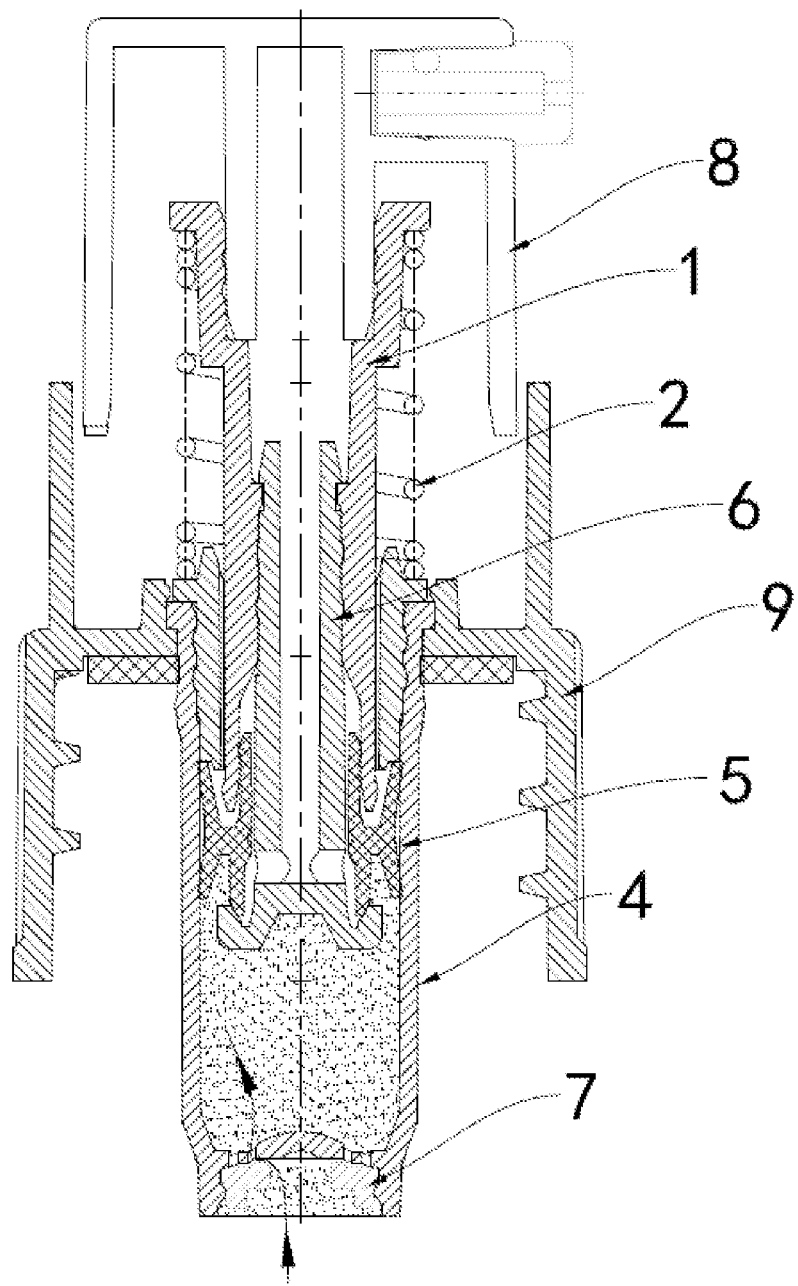
FIG. 24 is a schematic diagram of the mounting and connection between the liquid pump and a container lid of Embodiment 2, wherein the liquid pump sucks liquid from the bottle body.
Figure 25:
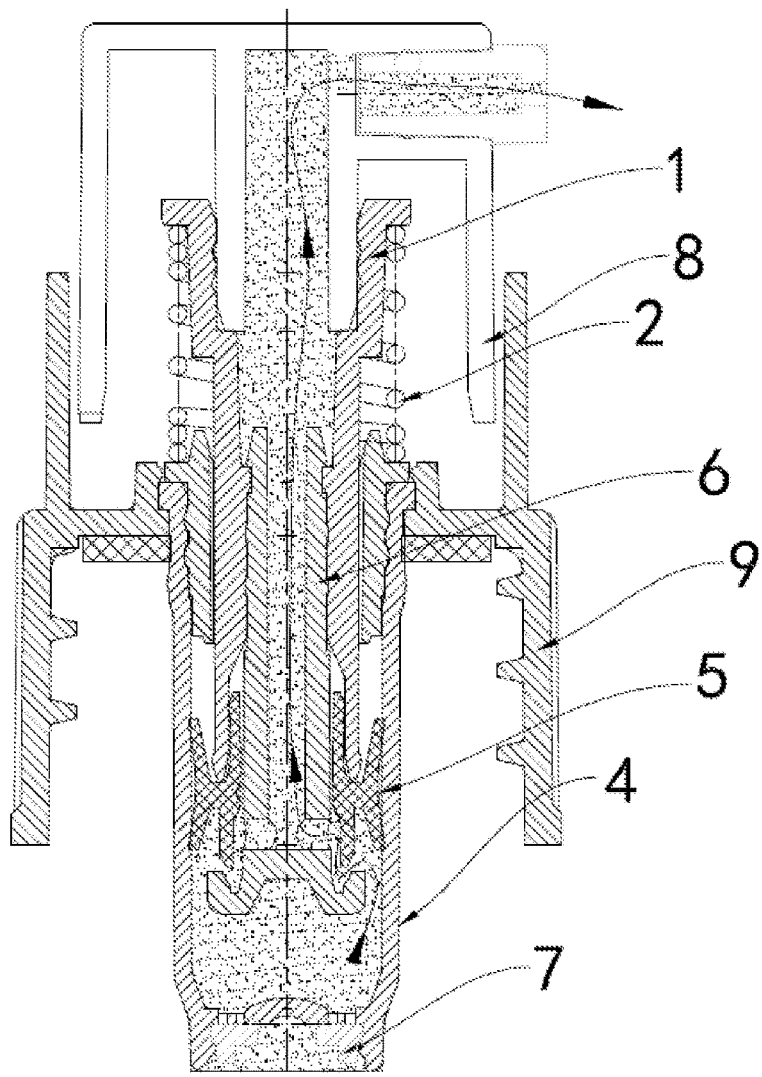
FIG. 25 is a schematic diagram of the mounting and connection between the liquid pump and the container lid of Embodiment 2, wherein the liquid pump pumps liquid out.
Figure 26:
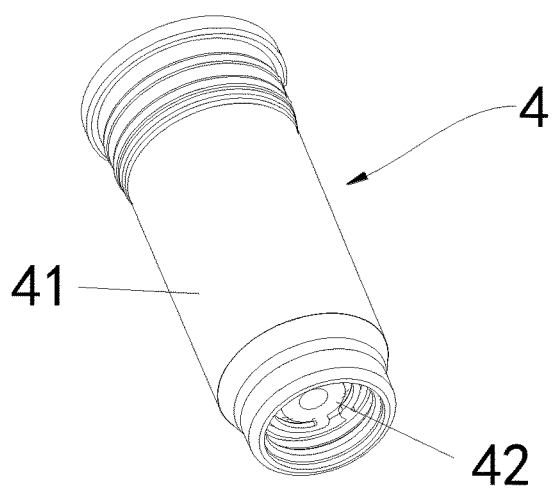
FIG. 26 is a schematic three-dimensional diagram of a pump body in the liquid pump of Embodiment 2.
Figure 27:
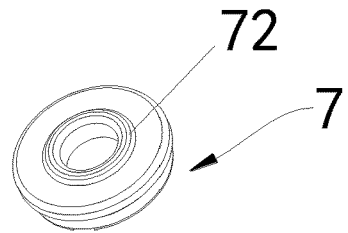
FIG. 27 is a schematic three-dimensional diagram of a valve seat in the liquid pump of Embodiment 2.

As shown in FIGS. 1 to 4, a liquid pump comprises a connecting rod 1, a spring 2, a lock cover 3, a pump body 4, a piston 5, a piston rod 6, and a valve seat 7, wherein the valve seat 7 is mounted on the lower end portion of the pump body 4, the lock cover 3 is fixedly disposed on the upper end portion of the pump body 4, the connecting rod 1 and the lock cover 3 are slidably fitted, the piston rod 6 is fixedly connected with the connecting rod 1, and the piston 5 is slidably sleeved on the piston rod 6, and the piston 5 is slidably disposed in the pump body 4 and is in a sealed connection with the pump body 4. Referring to FIGS. 5 and 6, the upper end of the connecting rod 1 is fixedly provided with a pressing head cap 8, the pump body 4 is mounted in a pump cover 9 of a container such as a bottle, and the lower part of the valve seat 7 is fixedly provided with a suction pipe 10 to extend into the container to suck up the liquid.

The detailed structure of the liquid pump is described as follows:

The pump body 4 is an integral part integrally formed by the same material, in this embodiment, the pump body 4 is obtained by integrally molding from PP plastic. Of course, the pump body 4 can also be obtained by molding from the same type of conventional plastic as PP plastic.

Specifically, as shown in FIGS. 11 to 13, the pump body 4 comprises a shell 41 with a hollow pump cavity, and an elastic valve plate 42 disposed at a bottom end portion of the shell 41, the elastic valve plate 42 is integrally formed at the bottom end of the shell 41, and the elastic valve plate 42 is provided with a valve passage.

Specifically, the elastic valve plate 42 comprises a valve plate 421 and an elastic strip 422 connected between the valve plate 421 and an inner peripheral wall of the shell 41, there are gaps between the elastic strip 422 and the valve plate 421 and between the elastic strip 422 and the inner peripheral wall of the shell 41, and all the gaps together form the valve passage of the pump body 4.

Here, the valve plate 421 is in the shape of a disc, and a plurality of elastic strips 422 is provided, and here, specifically, there are three elastic strips 422, and all the elastic strips 422 are distributed on the circumferential outer side of the valve plate 421 at intervals along the circumferential direction. Each elastic strip 422 comprises an arc-shaped extension section 422a, and a first connecting section 422b and a second connecting section 422c respectively disposed at two ends of the arc-shaped extension section 422a, the extension trajectory of the arc-shaped extension section 422a mentioned above is an arc with the center of the valve plate 421 as the center of rotation, and the first connecting section 422b extends inward along the radial direction of the arc-shaped extension section 422a and is connected to the valve plate 421, and the second connecting section 422c extends outward along the radial direction of the arc-shaped extension section 422a and is connected to the shell 41.

The valve seat 7 is disposed below the elastic valve plate 42 in a fitted manner, referring to FIGS. 3 to 6, and FIGS. 18 and 19, the valve seat 7 comprises a valve body 71 with a liquid flow passage 711, and the top of the valve body 71 is provided with a seal structure that can be fitted with the elastic valve plate 42 in a sealed manner. Here, the seal structure comprises an annular protruding platform 72 disposed on the top of the valve body 71, and the top end surface of the annular protruding platform 72 is fitted and in contact with the bottom end surface of the valve plate 421 to achieve sealing between the annular protruding platform 72 and the valve plate 421, and then to achieve sealing of the liquid flow passage 711 by the valve plate 421. The annular protruding platform 72 surrounds the mouth of the liquid flow passage 711. When the valve plate 421 is disengaged from the annular protruding platform 72, and the liquid flow passage 711 and the valve passage of the pump body 4 communicate with each other.

In some other embodiments, the top plane of the valve body 71 can also be directly fitted with the bottom end surface of the valve plate 421 to form a seal between the two, that is, the top plane of the valve body 71 directly constitutes the above-mentioned seal structure.

The valve seat 7 is also an integral part integrally formed by PP plastic, in other embodiments, the valve seat 7 may be obtained by molding from the same type of conventional plastic as PP plastic, the valve seat 7 and the pump body 4 are obtained by respectively molding from the same kind of recyclable plastics.

When the valve seat 7 and the pump body 4 are mounted in a fitted manner, the valve seat 7 is detachably clamped and fixed on a lower portion of the shell 41 and is located below the elastic valve plate 42, specifically, an annular protrusion 73 can be disposed on the upper portion of the valve body 71, an annular clamping groove can be opened below the pump body 4, and the valve body 71 can be inserted upward to the bottom of the pump body 4, so that the annular protrusion 73 and the annular groove are fitted with each other to complete the assembly of the two. At this moment, the top end surface of the annular protruding platform 72 pushes against the bottom end surface of the valve plate 421, and the elastic valve plate 42 is switched between an open state (the liquid flow passage 711 and the valve passage of the pump body 4 communicate with each other) and a closed state (the communication between the liquid flow passage 711 and the valve passage of the pump body 4 is closed) through the elastic deformation of the elastic valve plate 42. By adjusting the height of the annular protruding platform 72, the sealing effect of the valve seat 7 can be adjusted.

Specifically, when the elastic valve plate 42 is in the open state, the valve plate 421 elastically moves upward, the valve plate 421 is disengaged from the annular protruding platform 72, the seal between the two is released, and the valve passage and the liquid flow passage 711 communicate with each other; when the elastic valve plate 42 is in the closed state, the valve plate 421 resets, and the valve plate 421 and the annular protruding platform 72 are in a sealing fit, so that the valve passage and the liquid flow passage 711 are not communicated with each other In this way, only the air pressure in the pump body 4 needs to change so as to elastically deform the elastic valve plate 42 correspondingly, so that the elastic valve plate 42 can be switched between the open state and the closed state, so that the liquid passes through the liquid flow passage 711, and then enters the pump body 4 from the liquid flow passage 711. Such a structure is simple, and the pump body 4 and the valve seat 7 are respectively integrally formed with PP plastic, the production process and cost are low, and the assembly is also very convenient.

Referring to FIGS. 3 and 4, and FIGS. 14 to 17, the piston rod 6 comprises a rod body 61 fitted and connected with the connecting rod 1, and a piston head 62 fixedly disposed on a lower end of the rod body 61. The piston rod 6 is connected at the lower portion of the connecting rod 1, the connecting rod 1 has a mounting hole extending in the axial direction, the rod body 61 of the piston rod 6 passes through the mounting hole in a fitted manner in the axial direction, and the piston rod 6 is located below the connecting rod 1.

Clamping structures fitted with each other are provided between an outer peripheral portion of the piston rod 6 and an inner peripheral wall of the mounting hole of the connecting rod 1.

Specifically, the clamping structure specifically comprises an annular positioning protrusion 12 disposed on the inner peripheral wall of the mounting hole of the connecting rod 1, and a positioning groove 6a disposed on the outer peripheral portion of the rod body 61 of the piston rod 6, and the annular positioning protrusion 12 is fitted with and clamped in the positioning groove 6a.

The clamping structure further comprises a plurality of annular clamping grooves 13 disposed on the inner peripheral wall of the mounting hole of the connecting rod 1 at intervals along the axial direction of the connecting rod 1, and a plurality of annular clamping protruding platforms 6b disposed on the outer peripheral portion of the rod body 61 at intervals along the axial direction of the piston rod 6, the annular positioning protrusion 12 is located above all the annular clamping grooves 13, the positioning groove 6a is located above all the annular clamping protruding platforms 6b, and all the annular clamping protruding platforms 6b are fitted and clamped with all the annular clamping grooves 13 in a one-to-one correspondence. In this embodiment, two groups of annular clamping protruding platforms 6b and annular clamping grooves 13 are respectively provided; the connecting rod 1 and the piston rod 6 are both made of PP material or PE material. In this way, it can not only ensure that the materials of the connecting rod 1 and the piston rod 6 can be recycled, but also the fitting connection structure between the two can fully and effectively ensure the anti-loosening between the two, so that the connection between the two is very stable and efficient.

The rod body 61 of the piston rod 6 is opened with a liquid outlet channel 611 extending in the axial direction, the lower portion of the rod body 61 close to the piston head 62 is opened with a liquid outlet hole 612 communicating with the liquid outlet channel 611, and the piston 5 is sleeved on the rod body 61 and located above the piston head 62.

The piston 5 has an inner piston body 52 in sliding fit with the rod body 6, and an outer piston body 51 in sliding fit with the pump body 4, and the inner piston body 52 and the outer piston body 51 are fixedly connected at the middle positions. At the upper and lower ends of the piston 5, the inner piston body 52 and the outer piston body 51 are disposed with a distance in the radial direction.

An annular groove 63 is formed between the piston head 62 and the rod body 61, into which a lower end portion of the inner piston body 52 can be inserted in a fitted manner. The outer groove wall of the annular groove 63 forms an annular slope 63a, and the outer surface of the bottom end of the inner piston body 52 forms an annular slope 52a. When the lower end portion of the inner piston body 52 is inserted into the annular groove 63, the annular slope 52a and the annular slope 63a are fitted and in contact each other to form a seal between the two. When the piston 5 is sealed and fitted with the piston head 62, the liquid in the cavity of the pump body 4 cannot enter the piston rod 6, and thus cannot enter the liquid outlet channel 611; when the piston 5 is disengaged from the piston head 62, the liquid in the cavity of the pump body 4 can pass through the gap between the piston 5 and the piston head 62 and the liquid outlet hole 612 and enter the liquid outlet channel 611 in sequence, and then be pumped out through the connecting rod 1.

The above arrangement of the piston 5 and the piston rod 6 also enables the piston 5 to have the effect of preventing cracking. When the process that the piston rod 6 moves upward and drives the piston 5 to move upward, and is kept at the uppermost end for a long time under the action of the spring 2, the annular slope 52a of the inner piston body 52 receives a radially inward force from the annular slope 63a, therefore, even after long-term use or multiple frequency use, the piston 5 will not be cracked and deformed by the action of the piston rod 6.

Figure 1:
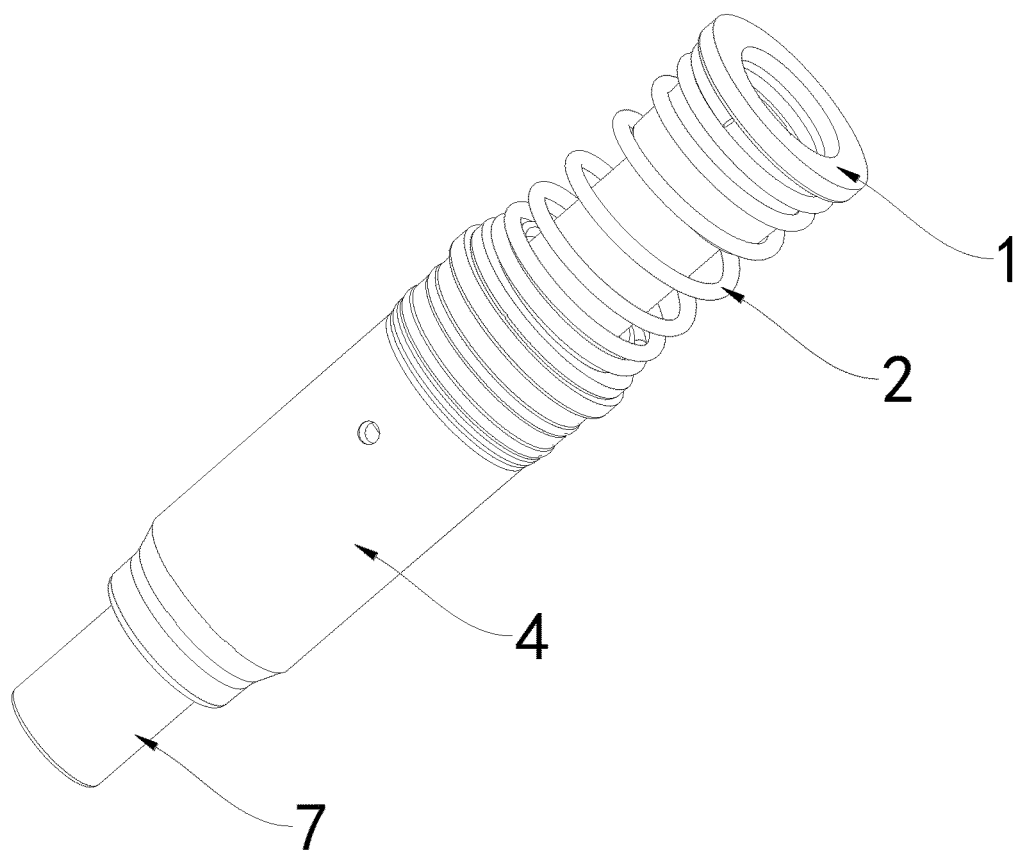
FIG. 1 is a schematic diagram of the overall structure of the liquid pump of Embodiment 1, wherein the liquid pump is in an unpressed state.
Figure 2:
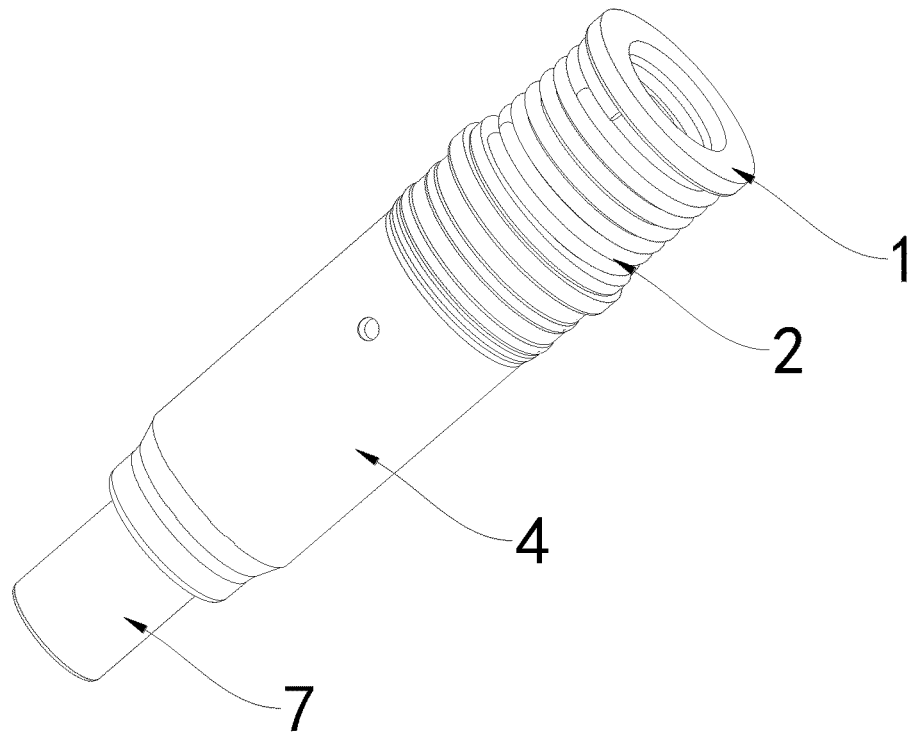
FIG. 2 is a schematic diagram of the overall structure of the liquid pump of Embodiment 1, wherein the liquid pump is in a pressed state.
Figure 3:
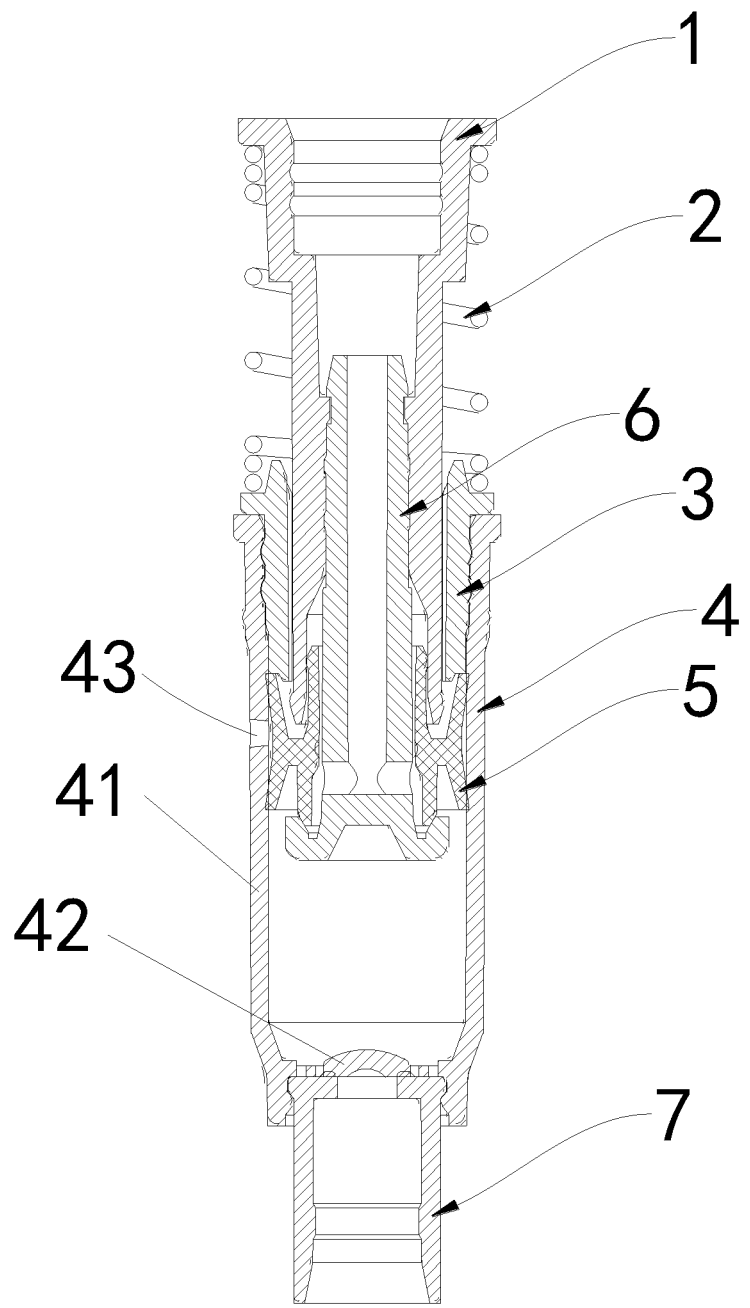
FIG. 3 is a schematic longitudinal cutaway view of the liquid pump of Embodiment 1, wherein the liquid pump is in the unpressed state.
Figure 4:
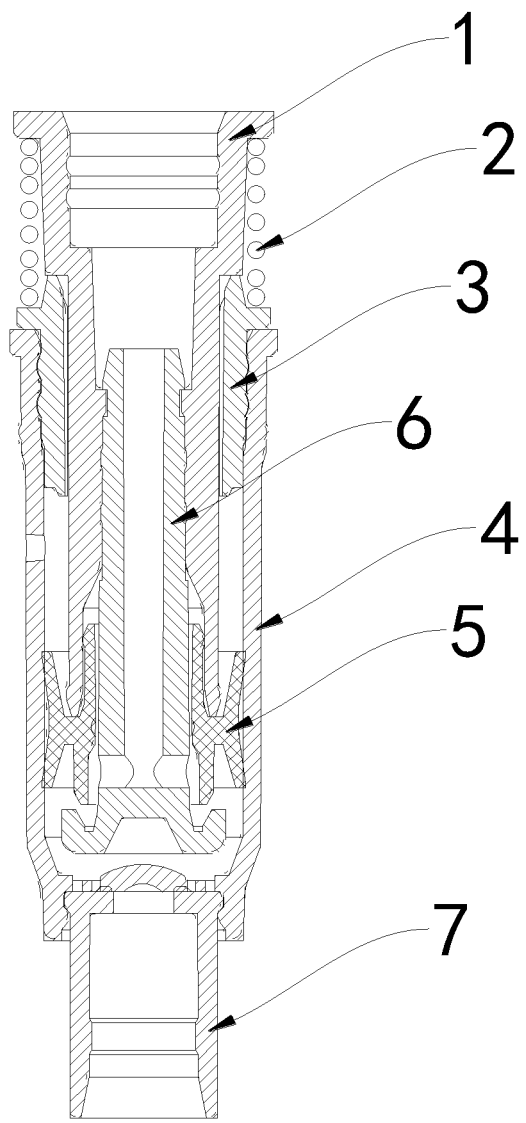
FIG. 4 is a schematic longitudinal cutaway view of the liquid pump of Embodiment 1, wherein the liquid pump is in the pressed state.

Referring to FIGS. 3 and 4, an annular groove is also formed between the upper portion of the inner piston body 52 of the piston 5 and the upper portion of the outer piston body 51, the inner piston body 52 of the piston 5 is sleeved on the rod body 61 of the piston rod 6, and the lower portion of the connecting rod 1 is sleeved on the upper portion of the inner piston body 52 and can be inserted into the above-mentioned annular groove in a fitted manner. The configuration between the connecting rod 1 and the piston 5 and the piston rod 6 should be such that: in the process of driving the connecting rod 1 downward, after the connecting rod 1 and the piston rod 6 move downward for a distance, the bottom end surface of the connecting rod 1 can press against the bottom groove wall of the annular groove and push the piston 5 to move downward together, and during the downward movement, the seal between the piston 5 and the piston head 62 is released; when the connecting rod 1 moves upward, the piston head 62 moves upward and firstly contacts the piston 5 and seals with the piston 5, and then moves upward synchronously with the piston 5.

The lock cover 3 is opened with a through hole penetrating in the axial direction, and the through hole is mainly used for mounting the connecting rod 1. The inner peripheral portion of the lock cover 3 has a plurality of ribs 31 extending in the up-down direction, all the ribs 31 are distributed at intervals along the circumferential direction, an air passage is formed between two adjacent ribs 31, and the connecting rod 1 passes through the above through hole in a fitted manner in the axial direction.

In this embodiment, the upper portion of the shell 41 of the pump body 4 is also provided with a balance air hole 43, and the balance air hole 43 communicates with the hollow pump cavity.

During the sliding process of the connecting rod 1 relative to the lock cover 3, when the piston 5 cannot cover the balance air hole 43, the external air can enter the pump body 4 and enter the bottle body through the balance air hole 43 on the pump body 4, to balance the air pressure inside and outside the bottle, so as to avoid the occurrence of the collapsed bottle caused by the unbalanced air pressure in the bottle body.

The outer peripheral portion of the lock cover 3 and the upper portion of the pump body 4 are clamped and fixed with each other in a fitted manner through a plurality of pairs of clamping grooves and protrusions 32, which play the role of preventing loosening and sealing with each other; the spring 2 is disposed between the connecting rod 1 and the lock cover 3 to provide the force required for the connecting rod 1 to move upward and away from the lock cover 3.

The connecting rod 1 is provided with an upper limit flange 15 and a lower limit flange 14, the lower limit flange 14 is used to abut against the upper portion of the lock cover 3 to limit the limit position of the downward movement of the connecting rod 1, the lock cover 3 is provided with an annular flange 33, the spring 2 is sleeved on the connecting rod 1 and partially sleeved on the upper portion of the lock cover 3, and both ends of the spring 2 abut between the upper limit flange 15 and the annular flange 33.

The annular flange disposed on the upper end of the pump body 4 also only needs to fit with the lock cover 3, and its size does not need to be too large, so there is no need to leave a flange with larger size on the pump cover 9 for fitting, which effectively reduces the external dimensions of the product.

The lower end portion of the connecting rod 1 has a limit protruding platform 11 protruding outward along the outer peripheral wall of the connecting rod 1, the outer diameter of the limit protruding platform 11 is larger than the aperture of the through hole of the lock cover 3, and the limit protruding platform 11 is located below the lock cover 3. This can effectively prevent the connecting rod 1 from coming out of the lock cover 3.

The overall assembly drawings of the liquid pump are shown in FIGS. 3 to 6. During operation, the connecting rod 1 is driven to drive the piston rod 6 and the piston 5 downward by exerting force on the pressing head cap 8, and during the downward movement, the piston rod 6 is firstly disengaged from the piston 5, under the acting force of the spring 2, the connecting rod 1 resets upward, so that the piston rod 6 and the piston 5 move up synchronously, and the piston rod 6 and the piston 5 maintain a sealing fit, resulting in that the pressure in the hollow pump cavity below the piston 5 is reduced, the elastic valve plate 42 is deformed, and the valve plate 421 moves upwards and is disengaged from the valve seat 7, resulting in that the seal between the valve plate 421 and the valve seat 7 is released, and the liquid in the container enters the pump body 4 through the liquid flow passage 711 and the valve passage, and is stored in the hollow pump cavity below the piston 5 to realize liquid suction; after the connecting rod 1 completely resets, the valve plate 421 resets to close the valve passage.

A force is applied to the pressing head cap 8 again to drive the connecting rod 1 to drive the piston rod 6 and the piston 5 downward, and the piston rod 6 slides relative to the piston 5, so that the seal between the piston rod 6 and the piston 5 is released, and the liquid stored in the pump body 4 will enter the connecting 2 through the liquid outlet hole 612 and the liquid outlet passage 611 and be pumped out to realize the liquid outlet operation.

Embodiment 2

Referring to FIGS. 20 to 27, the main difference between the liquid pump shown in this embodiment and the liquid pump in Embodiment 1 is that the liquid pump in this embodiment is a vacuum pump, and the shell 41 of the pump body 4 does not need to be provided with a balance air hole.

To sum up, the liquid pump of the present disclosure has a small total number of parts, which saves production costs, and makes product assembly more convenient, and the product has strong durability. At the same time, all parts in the liquid pump are basically made of recyclable plastics, which can be fully recycled.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A liquid pump, comprising:
    a pump body;
    a valve seat, the valve seat being mounted at a lower end portion of the pump body, wherein the pump body is an integral part integrally formed by a same material, the pump body comprising a shell with a hollow pump cavity and an elastic valve plate disposed at a bottom end portion of the shell, and the elastic valve plate is provided with a valve passage, the valve seat being disposed below the elastic valve plate in a fitted manner, the valve seat comprising a valve body with a liquid flow passage, and a top of the valve body is provided with a seal structure that can be fitted with the elastic valve plate in a sealed manner;
    a piston;
    a piston rod, the piston rod comprises a rod body and a piston head fixedly disposed on a lower end of the rod body, the rod body is provided with a liquid outlet channel extending in an axial direction, and a lower portion of the rod body is opened with a liquid outlet hole communicating with the liquid outlet channel, the piston having an inner piston body and an outer piston body that are coaxially and fixedly disposed, the inner piston body is disposed on the rod body in a sliding fit, and the outer piston body is disposed in the hollow pump cavity of the pump body in a sliding fit, wherein an annular groove is formed between the piston head and the rod body, into which a lower end portion of the inner piston body can be inserted in a fitted manner;
    a connecting rod, the connecting rod having a mounting hole extending in the axial direction, the rod body of the piston rod passes through the mounting hole in a fitted manner in the axial direction, clamping structures fitted with each other are provided between an outer peripheral portion of the piston rod and an inner peripheral wall of the mounting hole;
    a lock cover, the lock cover fixedly disposed on an upper end portion of the pump body, the connecting rod and the lock cover are in a sliding fit, and the lock cover is provided with a through hole penetrating in the axial direction, the connecting rod passes through the through hole in a sliding fit in the axial direction, and the liquid pump further comprising an elastic member disposed between an upper end portion of the lock cover and an upper end portion of the connecting rod and providing a force required for the connecting rod to move upward, a lower end portion of the connecting rod has a limit protruding platform protruding outward along an outer peripheral wall of the connecting rod, an outer diameter of the limit protruding platform is larger than an aperture of the through hole, and the limit protruding platform is located below the lock cover; and
    an elastic member, the elastic member disposed between the lock cover and the connecting rod and providing a force required for the connecting rod to move upward and away from the lock cover.

2. The liquid pump according to claim 1, wherein the elastic valve plate comprises a valve plate and an elastic strip connected between the valve plate and an inner peripheral wall of the shell, further wherein gaps exist between the elastic strip and the valve plate and between the elastic strip and the inner peripheral wall of the shell, and the gaps together form the valve passage.

3. The liquid pump according to claim 2, wherein the valve plate is in a shape of a disc, a plurality of elastic strips is provided, and the elastic strips are distributed on a circumferential outer side of the valve plate at intervals along a circumferential direction, each elastic strip comprising an arc-shaped extension section, and a first connecting section and a second connecting section respectively disposed at two ends of the arc-shaped extension section, an extension trajectory of the arc-shaped extension section is an arc with a center of the valve plate as a center of rotation, the first connecting section extends inward along a radial direction of the arc-shaped extension section and is connected to the valve plate, and the second connecting section extends outward along the radial direction of the arc-shaped extension section and is connected to the shell.

4. The liquid pump according to claim 3, wherein there are three elastic strips evenly spaced in a circumferential direction.

5. The liquid pump according to claim 2, wherein the seal structure is an annular protruding platform or a flat surface disposed on the top of the valve body, and a top end surface of the annular protruding platform or the flat surface is fitted and in contact with a bottom end surface of the valve plate.

6. The liquid pump according to claim 2, wherein the elastic valve plate has an open state and a closed state, and when the elastic valve plate is in the open state, the valve plate elastically moves upward, the valve plate is disengaged from the seal structure, and the valve passage and the liquid flow passage communicate with each other; and when the elastic valve plate is in the closed state, the valve plate resets, the valve plate and the seal structure are in a sealing fit, and the valve passage and the liquid flow passage are not communicated with each other.

7. The liquid pump according to claim 1, wherein the valve seat is detachably clamped and fixed on a lower portion of the shell, and is located below the elastic valve plate.

8. The liquid pump according to claim 1, wherein both the valve seat and the pump body are obtained by molding from recyclable plastics.

9. The liquid pump according to claim 1, wherein the clamping structures comprises an annular positioning protrusion disposed on the inner peripheral wall of the mounting hole, and a positioning groove disposed on the outer peripheral portion of the piston rod, and the annular positioning protrusion is fitted with and clamped in the positioning groove; the clamping structure further comprising a plurality of annular clamping grooves disposed on the inner peripheral wall of the mounting hole at intervals along the axial direction, and a plurality of annular clamping protruding platforms disposed on the outer peripheral portion of the piston rod at intervals along the axial direction, the annular positioning protrusion is located above all the annular clamping grooves, the positioning groove is located above all the annular clamping protruding platforms, and all the annular clamping protruding platforms are fitted and clamped with all the annular clamping grooves in a one-to-one correspondence.

10. The liquid pump according to claim 1, wherein an inner peripheral portion of the lock cover has a plurality of ribs extending in an up-down direction, all the ribs are distributed at intervals along a circumferential direction, and an air passage is formed between two adjacent ribs.

11. The liquid pump according to claim 1, wherein an outer peripheral portion of the lock cover and an upper portion of the pump body are clamped and fixed with each other in a fitted manner through a plurality of pairs of clamping grooves and protrusions.

12. The liquid pump according to claim 1, wherein the inner piston body and the outer piston body are fixedly connected at the middle positions, at upper and lower ends of the piston, the inner piston body and the outer piston body are disposed with a distance in a radial direction of the piston.

13. The liquid pump according to claim 1, wherein an outer groove wall of the annular groove forms one annular slope, and an outer surface of a bottom end of the inner piston body forms another annular slope, when the lower end portion of the inner piston body is inserted into the annular groove, the two annular slopes are fitted and in contact each other to form a seal between the piston and the piston head.

14. The liquid pump according to claim 1, wherein the liquid outlet hole is provided at a position near the piston head at a lower portion of the rod body, and there is a gap between a lower inner circumferential surface of the inner piston body and the rod body.

* * * * *